United States Patent [19]

Jones

[11] 4,271,116
[45] Jun. 2, 1981

[54] COMPOSITE STRUCTURE

[75] Inventor: William R. Jones, Heage, England

[73] Assignee: Rolls-Royce Limited, London, England

[21] Appl. No.: 114,961

[22] Filed: Jan. 24, 1980

[30] Foreign Application Priority Data

Feb. 20, 1979 [GB] United Kingdom ............... 05927/79

[51] Int. Cl.³ .............................................. B29C 1/02
[52] U.S. Cl. .................................. 264/221; 264/257;
264/258; 264/313; 264/316; 264/324; 264/325
[58] Field of Search .............. 264/221, 257, 258, 313,
264/314, 316, 324, 325, 317, DIG. 44;
425/DIG. 12

[56] References Cited

U.S. PATENT DOCUMENTS

| 3,059,282 | 10/1962 | Smith | 264/317 |
|---|---|---|---|
| 3,368,239 | 2/1968 | Wiltshire | 264/257 |
| 3,442,998 | 5/1969 | Wiltshire | 264/257 |
| 3,817,806 | 6/1974 | Anderson et al. | 264/257 |
| 3,887,579 | 6/1975 | Brunet et al. | 264/257 |
| 4,062,917 | 12/1977 | Hill et al. | 264/257 |
| 4,080,416 | 3/1978 | Howard | 264/257 |
| 4,115,504 | 9/1978 | DeWitte et al. | 264/DIG. 44 |

Primary Examiner—Donald E. Czaja
Assistant Examiner—W. Thompson
Attorney, Agent, or Firm—Cushman, Darby & Cushman

[57] ABSTRACT

A method of making a composite structure upon a solid former having a low melting point, comprises placing the former together with the laid-up composite within a mould, raising the temperature of the mould such as to melt the former and expand it such that it consolidates the composite within the mould.

15 Claims, 2 Drawing Figures

COMPOSITE STRUCTURE

BACKGROUND OF THE INVENTION

This invention relates to composite structures and in particular to a method of manufacturing such structures from fibre reinforced resin material.

The use of fibre reinforced resin composites for applications requiring a lightweight but strong structure is well known. The fibres most commonly used for such applications usually consist of either glass, carbon or metal, however a variety of other well known high strength materials could equally well be utilised. The fibre reinforced resin material is usually laid up in the form of laminations within a mould. Alternatively, it may be filament wound into a mould in the form of a resin impregnated multi-filament tow.

Such methods of making composite structures suffer a disadvantage in that it has proved difficult when using relatively stiff fibres to ensure that they follow changes of direction within the mould during the moulding process. This results in the fibre in these particular locations being inadequately compacted. This has proved a particular problem when making composite structures of complex three dimensional shape. This affects the overall strength of the structure and causes difficulties in maintaining dimensional tolerances in the completed composite structure.

An object of the present invention is to provide a method of manufacturing a composite structure in which the aforementioned disadvantage is substantially eliminated.

DETAILED DESCRIPTION OF THE INVENTION

According to the present invention a method of manufacturing a composite fibre reinforced resin structure comprises, making a solid former, from a low melting point material, coating the former with a layer of substantially impervious elastic material, laying up, or filament winding at least one layer of fibre upon the elastic layer, which layer of fibre may be pre-impregnated with resin or alternatively be provided with resin either during or after the laying up, or winding layer.

placing the assembly within a mould, raising the temperature of the mould and assembly such that the solid former melts and expands to consolidate the fibre reinforced resin material against the mould walls;

then maintaining or further raising the temperature to at least pre-cure the resin.

According to a further aspect of the invention, a method of manufacturing a composite reinforced resin structure comprises, making a solid former from a low melting point material, coating the former with a layer of substantially impervious elastic material, covering the elastic layer with a layer of bleed cloth, covering the bleed cloth with a perforate release layer, laying up or filament winding at least one layer of fibre upon the release layer, placing the assembly within a mould, raising the temperature of the mould and assembly such that the solid former melts and expands to consolidate the fibre reinforced resin material against the mould walls;

then maintaining or further raising the temperature to at least pre-cure the resin.

Preferably the former comprises a male former and the mould comprises a female mould and furthermore the former may be manufactured from a wax of the type used in the lost wax casting process, or alternatively the former may be manufactured from a low melting point metal.

Preferably the release layer comprises a layer of perforated P.T.F.E.

According to yet another aspect of the present invention the former may be provided with pressure control means such that its pressure may be adjusted to a predetermined value when it is in the molten state.

Preferably the composite structure comprises carbon, glass or aromatic polyamide fibres secured together within a resin matrix.

BRIEF DESCRIPTION OF THE DRAWINGS

The invention will now be more particularly described by way of example only and with reference to the accompanying drawings in which.

DESCRIPTION OF THE PREFERRED EMBODIMENTS

Figure 1:
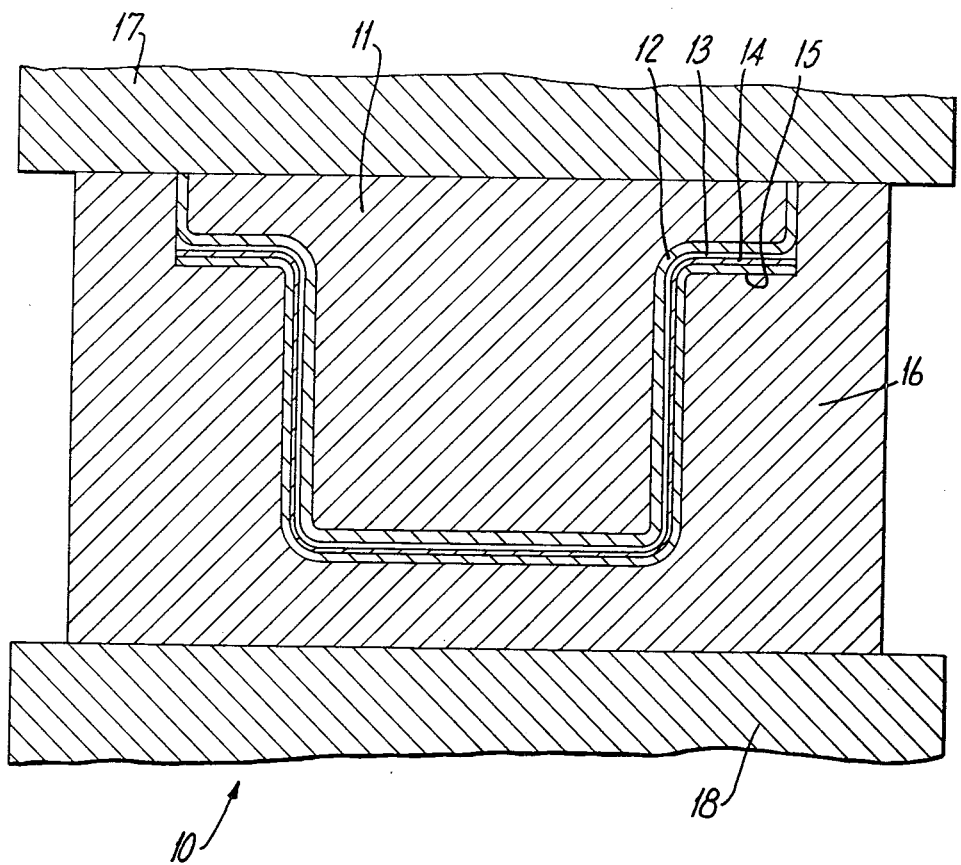
FIG. 1 shows a cross-sectional view of a mould and former assembly suitable for making a composite structure in accordance with the present invention.
Figure 2:
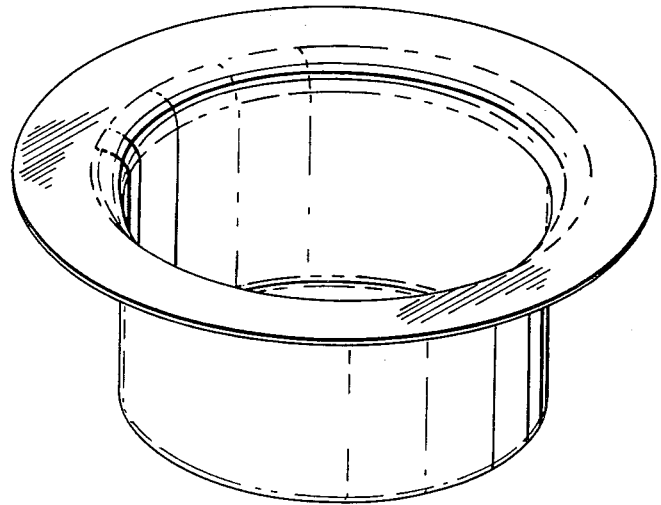
FIG. 2 shows a completed composite structure made in accordance with the present invention.

Referring to FIG. 1 of the drawings an apparatus suitable for making a composite structure is shown generally at 10, and comprises a cylindrical male former 11 which is made from a low melting point material. Radially outwardly of the former 11 is provided a layer of elastic material 12 which is further covered with a layer of bleed cloth 13. The bleed cloth 13 is in turn covered with a perforate release layer 14 upon which the composite structure 15 is assembled.

The composite structure 15 may either be laid up on the release layer 14 in the form of individual laminations of fibre reinforced resin sheets. Alternatively the composite structure may be filament wound using a multi-filament tow of fibre reinforced resin.

The entire assembly of the former 11 and respective layers 12, 13, 14 and 15 are enclosed within a female mould 16 which is secured and sealed between plattens 17 and 18 of a press not shown in the drawings. Alternatively the female mould and assembly may be secured and sealed without the aid of a press using a suitable form of restraining structure.

The apparatus and method of performing the invention will now be described in greater detail. The former 11 is made from a low melting point material such as for example wax of the type commonly used in the lost wax casting process, alternatively the former may be made from a low melting point metal for example a lead alloy or other suitable material.

The former 11 is covered with a layer of elastic material 12 which may consist of a silicone rubber this being applied to the former 11 by either painting, dipping or spraying. Alternatively the coating may be injected onto the wax within the mould. A number of separate coats of the rubber may be applied to build up the appropriate thickness.

A layer of bleed cloth 13 is then wrapped over the elastic layer 12, the cloth may be made from dry glass cloth or some similar type of material. The bleed cloth 13 is subsequently covered with a layer of perforate release material such as for example polytetrafluroethylene (P.T.F.E.). The material making up the composite structure 15 is then applied to the layer 14 in the manner previously described. This material may comprise any suitable high strength fibres, for example carbon, glass, boron or polyamide fibres secured together in a resin matrix.

The assembly comprising the former 11 carrying the respective layers 12, 13, 14 and the composite material 15 is then placed within a female mould 16 and the mould is then placed between the plattens 17 and 18 of a press where its temperature is raised by heaters not shown in the drawings to a temperature sufficient to melt the former, such that it expands and compresses the composite material 15 against the walls of the mould.

During the process the pressure exerted by the molten former 11 upon the composite material layer 15 may be controlled by pressure control means comprising valves and a pump etc. (not shown in the drawings) to a predetermined value.

The temperature of the assembly is then further increased under controlled pressure such that excess resin within the material may flow through the perforate release layer 14 and be absorbed by the bleed cloth 13, this part of the process could be further assisted by evacuation of the bleed cloth. The temperature and pressure may then be further adjusted such as to effect at least pre-curing of the resin, or alternatively the resin may be allowed to become fully cured. The completed composite structure is then subsequently removed from the mould.

It will be appreciated that it may be desirable in certain instances to remove the composite from the mould whilst the former is still in a molten state as then the former 11 may be simply poured from the structure. This feature permits the manufacture of structures having shapes wherein it would normally prove extremely difficult or even impossible to remove a solid former. Furthermore additional parts may be simultaneously moulded or bonded into the composite structure by being embedded within the former at their respective required positions. Obviously such parts may also be made from a composite material if so desired.

The necessary heaters used to raise the temperature of the assembly may be provided either within the plattens 17 and 18 of the press or within the mould. Alternatively the heaters may be actually provided within a portion of the former 11.

It will be noted that this particular method of carrying out this invention has involved the use of a perforate release layer and a bleed cloth. At present these are both considered essential features of the invention as all commercially available resin pre-impregnated fibre laminates or tapes contain an excess of resin, which must be removed during the mould cycle. This obviously is quite conveniently accomplished by use of an absorbent bleed cloth.

It is believed however that resin pre-impregnated tape or laminate material will shortly be available which contains only the desired amount of resin and in this cure the bleed cloth and perforate release layer would then become unnecessary, thus simplifying the method.

I claim:

1. A method of manufacturing a composite fiber reinforced resin structure comprising the steps of:
    (a) making a solid former from a low melting point material;
    (b) coating said former with at least one layer of a substantially imprevious elastic material;
    (c) applying at least one layer of fiber upon said elastic layer to form a fiber-reinforced resin material assembly, said fiber being provided with resin thereon;
    (d) placing the assembly within a heatable mold;
    (e) increasing the temperature of the mold and the assembly such that the former melts and expands to consolidate the fiber reinforced material against the mold walls;
    (f) maintaining said temperature of the mold and assembly to at least pre-cure the resin, and
    (g) removing the composite fiber reinforced resin structure from the mold.

2. The method as claimed in claim 1 wherein the fiber applied in step (c) is pre-impregnated with resin.

3. The method as claimed in claim 1 wherein the fiber is applied to the elastic layer by filament winding in step (c).

4. The method as claimed in claim 1 wherein the fiber is layed upon the elastic layer in step (c).

5. The method as claimed in claim 3 or 4 wherein resin is applied to fiber applied in step (c).

6. The method as claimed in claim 1, 2, or 3 wherein the former is a male mold member made of wax or a low melting point metal.

7. The method as claimed in claim 1, 2, or 3 wherein the pressure of the former is adjusted with a pressure control means to a predetermined value when in the molten state.

8. The method as claimed in claim 1, 2, or 3 wherein the composite structure is carbon fiber, glass fiber, or aromatic polyamide fiber secured together with a resin matrix.

9. A method of manufacturing a composite reinforced resin structure comprising the successive steps of:
    (a) making a solid former of a low melting point material;
    (b) coating said former with at least one layer of a substantially impervious elastic material;
    (c) covering the thus applied elastic material with a bleed cloth;
    (d) covering the bleed cloth with a perforate release layer;
    (e) applying at least one layer of fiber upon the release layer to form a fiber-reinforced resin material assembly, said fiber being provided with resin thereon;
    (f) placing the assembly in a heatable mold;
    (g) increasing the temperature of the mold and the assembly such that the solid former melts and expands consolidating the fiber reinforced resin material against the mold walls;
    (h) maintaining or increasing the temperature of the mold and assembly to at least pre-cure the resin; and
    (i) removing the composite fiber reinforced resin structure from the mold.

10. The method as claimed in claim 9 wherein the fiber applied in step (e) is pre-impregnated with resin.

11. The method as claimed in claim 9 wherein the fiber applied to the perforate release layer in step (e) is applied by filament winding.

12. The method as claimed in claim 9, 10, or 11 in which the release paper of step (d) comprising perforated PTFE.

13. The method as claimed in claim 9, 10, or 11 wherein the pressure of the former is adjusted with a pressure control means to a predetermined value when in the molten state.

14. The method as claimed in claim 9, 10, or 11 wherein the former is a male mold member made of wax or a low melting point material.

15. The method as claimed in claims 9, 10 or 11 wherein the composite structure is carbon fiber, glass fiber, or aromatic polyamide fiber secured together with a resin matrix.

* * * * *